June 16, 1959   D. L. JOHNSON   2,890,484
HIGH PRESSURE PROCESSING APPARATUS
Filed Jan. 3, 1957   3 Sheets-Sheet 1

INVENTOR
Donald Leland Johnson
BY
ATTORNEYS

June 16, 1959　　　D. L. JOHNSON　　　2,890,484
HIGH PRESSURE PROCESSING APPARATUS

Filed Jan. 3, 1957　　　　　　　　　　　3 Sheets-Sheet 2

INVENTOR
Donald Leland Johnson
BY
Pennie Edmonds Morton Barrows Taylor
ATTORNEYS June 16, 1959   D. L. JOHNSON   2,890,484
HIGH PRESSURE PROCESSING APPARATUS
Filed Jan. 3, 1957   3 Sheets-Sheet 3

INVENTOR
Donald Leland Johnson
BY
Pennie, Edmonds, Morton, Barrows, Taylor
ATTORNEYS

2,890,484

HIGH PRESSURE PROCESSING APPARATUS

Donald Leland Johnson, Tacoma, Wash., assignor to Rayonier Incorporated, Shelton, Wash., a corporation of Delaware Application January 3, 1957, Serial No. 632,395

1 Claim. (Cl. 18—6)

This invention relates to apparatus for compressing various materials in sheet form, comprising a plurality of rollers over which an endless metal band travels under tension, and means for feeding the material between the band and a curing roller. The invention is particularly concerned with apparatus of the type for compressing and curing material into dense sheets, comprising an arrangement of rollers including a curing roller, press roller, drive roller and tension roller, over which the band travels, whereby the material to be compressed is passed between the band and a substantial arcuate segment of the curing roller and is compressed under the tension of the band and the pressure of the press rollers, and means to heat the material where compression is taking place. The invention provides an improved apparatus of this type which is constructed and arranged to operate at higher band tension and increased lineal speed.

The apparatus heretofore proposed or used comprising an endless band traveling over a plurality of rollers usually includes a heated curing roller of relatively large diameter and one or more heated press rollers, the other rollers being unheated. As the cold band travels onto the heated rollers it expands with increase in temperature but the applied tension in the band keeps it against the roller. Then, as the hot band travels off the curing roller and onto the next roller it cools quickly from a high temperature, say, of 400° F. to about 100° F. and contracts against the friction on the roller causing increased tension and bending stresses. This temperature stress requires that the working band tension and pressure must be reduced to allow for the increased stress due to contraction on the cold rollers. Maximum band tension cannot be used when one roller is hot and others are cold because of the thermal stress resulting from contacting the cold rollers.

My invention is based, in part, on the discovery that when the heated band is passed over one or more cold rollers that the resulting contraction is sufficient to materially increase the tension on the band and limit its working tension. The tensile stress due to the uneven heating of the band on contacting heated and cooled rollers can require from 25 to 30% of the band strength. My invention provides an improved apparatus in which each roller over which the band passes is heated to about the same temperature and this enables one to operate the band under much higher tension with resulting greater pressure on the material and with less strain on the band.

I have found also that when all of the rollers are the same diameter one can obtain maximum pressure on the band with a minimum of stresses in the band due to flexure around the rollers. My invention, accordingly, provides an apparatus comprising rollers which are substantially all of the same diameter which results in a very appreciable increase in the working tension on the band.

The invention also provides a combination of the aforementioned apparatus with means for automatically "training" the band so that it will travel continuously over a selected area of the rollers and at about the same tension across the entire band. To this end, the invention provides an hydraulic system controlled by the lineal edge of the band to vary automatically the axial alignment of the adjustable tension roller.

My invention provides an improvement consisting of an automatic tensioning and training device in which the band remains centered to within a tolerance of about $\frac{1}{16}$ of an inch, the total tension on the band being according to the pressure setting, and the training movement of the tension roller being so small that the edges of the band will not become overstressed. In the case of a machine with a relatively wide band, a very small crown may be machined on the face of the tension roller to compensate for the slight tendency to stress the edges of the band more than the center. In a machine employing a band 40' long the total deformation or stretch under load will be approximately three quarters of an inch so that only small changes may be made in training the tension roller without seriously affecting the edges of the band. My training device, when employed with the proper crown on the tension roller, will keep a uniform tension in the band and maintain close centering of the band.

The direct tension in the band is the only stress which does useful work on the machine. This invention reduces all other stresses due to temperature, bending around the rollers and training of the band to the lowest amount possible thus leaving a greater percentage of the allowable combined stresses for direct tension and therefore providing higher band pressure than has been possible heretofore.

The apparatus of the invention can be used as in the vulcanizing of rubber sheets, in the compression of loose or bulky material into dense sheets, where the treatment requires heat to plasticize or to set the material and pressure to flatten and make it more dense. While the apparatus has general applicability for related processing of sheet material, it is advantageously suitable for compressing and curing bulky, loose webs of wood fibers or like materials into thin hard boards. Webs of such materials of indefinite length may be passed continuously through the apparatus and pressed to the required density while heating them to a temperature that will cure or set resinous material contained in or on the fibers.

These and other novel features of the invention will be better understood after considering the following discussion taken in conjunction with the accompanying drawings, in which.

Figure 1:
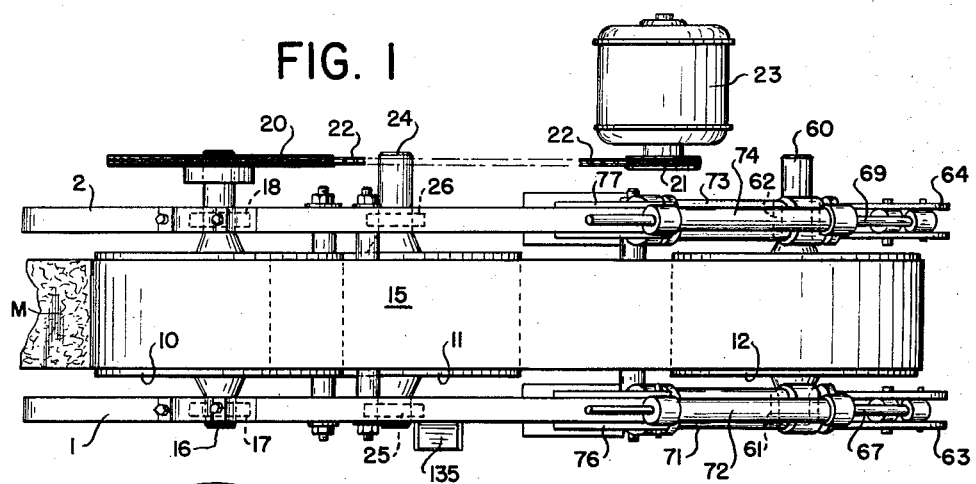
Fig. 1 is a plan view of apparatus embodying the invention.

The apparatus illustrated in the drawings is usually of very heavy construction and capable of being operated under very high ttotal pressures resulting from high unit pressures and wide bands. The apparatus comprises front and back side frames 1 and 2 which rest upon blocks 3, 4, 5 and 6 removably attached to the metal base plate 7 by bolts 8. The base plate is securely fastened to a concrete foundation 9.

The two side frames provide means for mounting and supporting the four rollers 10, 11, 12 and 13 over which the endless band 15 of high tensile strength steel or other alloy metal travels. These rollers are respectively the drive roller, the curing drum or roller, the tension roller and the press roller. The material M to be treated, for example a loose mat of wood fibers impregnated with resin to be pressed into a hard board, is fed in between the band and roller 11 to be given compression and resin-setting treatment.

In order to effect suitable treatment of the material it is necessary to employ a relatively large diameter curing roller, for example, one varying from about 24 to 96 inches in diameter. While it is contrary to the practices of the prior art, I provide an apparatus in which each roller is of about the same diameter with a resulting material increase in the working tension of the band. Due to the aforementioned uniform heating of the rollers, their equal diameter, and closely controlled "tracking" the apparatus can be operated at band speeds of 25 to 100 feet per minute and at pressures of from 150 to 200 p.s.i.

Figure 2:
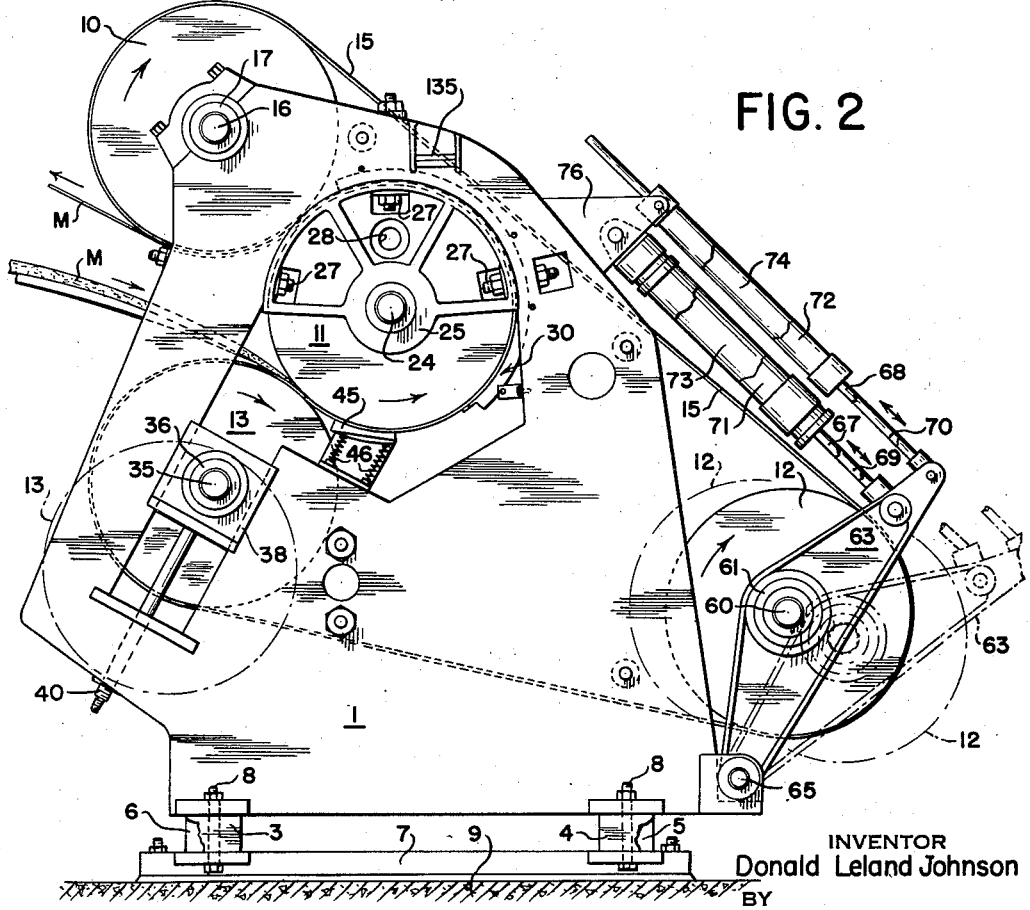
Fig. 2 is a side view from the front of the apparatus of Fig. 1.
Figure 6:
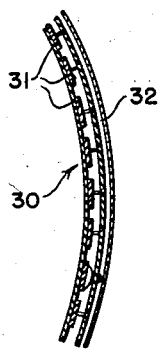
Fig. 6 is a sectional view at 6—6 of Fig. 5.
Figure 5:
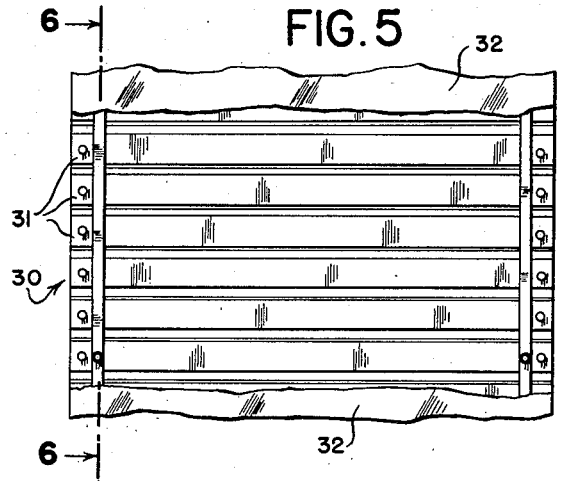
Fig. 5 is a front view of the means for heating the band at the curing roller.

The drive roller 10 is mounted on shaft 16 in the bearings 17 and 18, and is driven through the media of the sprocket gears 20 and 21 and chain 22 by the motor 23. The curing roller 11 is mounted on shaft 24 in removable bracket bearings 25 and 26. These bearings are secured to the frames by bolts 27, and roller 11 can be removed by supporting it on a bar (not shown) inserted through hole 28 and then removing the bolts 27 and the bracket bearings. This curing roller 11 may be regarded as the principal treatment roller because the material is pressed against it and heated. In the embodiment of the invention illustrated the material is heated both from the inside by the drum and the outside by electric heaters. It will be noted that roller 11 is so located that the endless band 15 must pass over a substantial arcuate segment thereof in passing around the rollers 10 and 13 and the band can accordingly apply any desired pressure over roller 11 up to the tension limits of the band. As shown in Fig. 2 the apparatus comprises a battery of electric heaters 30 arranged on the outside of the band 15 directly over the arcuate segment. These heaters comprise a number of removable curved elements 31 as best shown in Figs. 5 and 6, heated by electrical resistance, which heat the band to cause the heat to pass into the material being treated. One suitable type of heating unit is the GE Strip Heater No. 2A41262 of 500 watt and 220 volt capacity. The outside of the heater is covered with a reflecting stainless steel sheet 32. In order to effect a rapid heating of the material such as to vulcanize rubber, soften a thermoplastic resin or cure a thermosetting resin, temperatures of the order of from 300° to 450° F. may be used. In the apparatus heretofore used the band was similarly heated and suffered considerable contraction in contacting the first cold roller, such as roller 10, after leaving the curing roller. This contraction either necessitated a reduced working tension of the band, or imposed a dangerous strain on the metal if it were operated near its upper tension limits.

Press roller 13 is mounted on shaft 35 in a bearing 36 on each end of the shaft. These bearings are each mounted in a slidable bracket 38 which can be moved upwardly by a screw 40 which bears on the bracket. By means of these screws and brackets the roller 13 can be pressed against the band to supplement the pressure applied on the material by the band. In order to prevent a relaxation of this pressure after the band passes the lineal contact of roller 13, an arcuate press shoe 45 bears against the band applying pressure by the springs 46.

The adjustable band tensioning roller 12 is mounted on a shaft 60 in bearings 61 and 62 in the arms 63 and 64 respectively which are each pivotally connected to the frames 1 and 2 by a pin 65. The opposite ends of the arms 63 and 64 are each connected to piston rods 67, 68 and 69, 70 respectively, which are connected to pistons operable in the hydraulic cylinders 71, 72, 73 and 74 respectively. These pistons are operated by a liquid system diagrammatically illustrated in Fig. 7. By means of piston rods 67 and 69 any desired pressure may be applied on the arms 63 and 64 and shaft 60 which is transmitted to the band 15. The rods 68 and 70 are provided with means to adjust the angularity of shaft 60 to effect a control over the training of the band.

It is well known that in apparatus of the type described, there is a tendency for the band to wander from side to side and to be somewhat canted causing uneven tensions in the side portions of the band. In controlling the tracking of the band as practiced heretofore the band would frequently be "over trained" resulting in overstressing and damages to the sides of the band. The apparatus illustrated in Fig. 7 not only provides the required pressure on the arms to put the band under the desired tension through the medium of roller 12, but controls the angularity of the shaft 60 and roller 12. This apparatus for controlling the training of the band is described and claimed in my application Serial No. 621,594, filed November 13, 1956.

Figure 7:
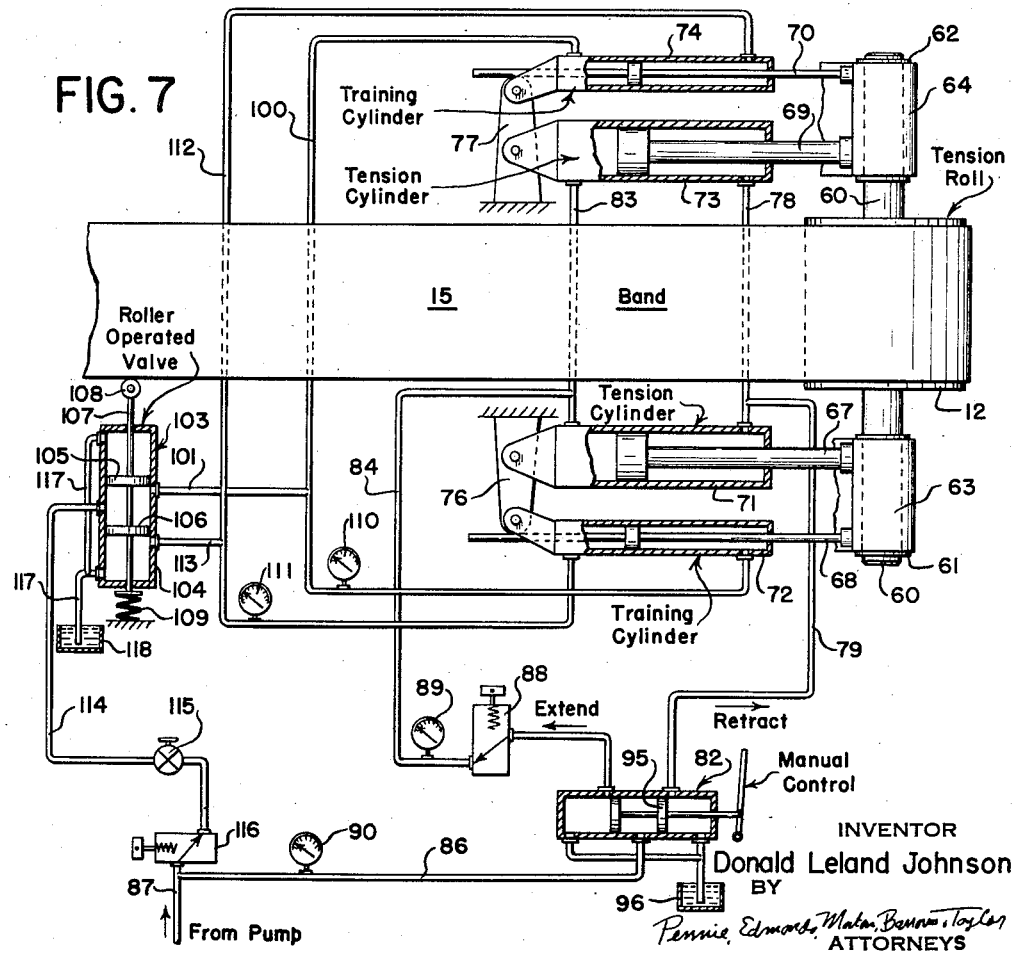
Fig. 7 is a diagrammatic illustration of apparatus for controlling the tension and location of the band.

The apparatus of Fig. 7 comprises the cylinders and pistons aforementioned. The cylinders are pivotally connected to brackets 76 and 77 on the frames 1 and 2 respectively. The cylinders 71 and 73 for applying pressure on the roller 12 to vary the band tension are cross-connected on the outlet side of each piston by pipe 78 which is connected by pipe 79 to the manually controlled four-way plug valve 82. The other ends of the cylinders 71 and 73 are cross-connected by pipe 83 which is connected by pipe 84 to the valve 82 which is supplied with high pressure liquid from pipe 86 and pipe 87 which leads to a pump for supplying high pressure liquid. Pipe 84 has a spring-loaded check valve 88, a pressure gage 89, and pipe 86 has a pressure gage 90. It will be noted that the liquid system for cylinders 71 and 73 can be operated independently of cylinders 72 and 74.

The piston valve 95 is shown in its neutral position which permits both ends of the cylinders 71 and 73 to drain into the sump 96. By shifting the piston valve 95 to the left as shown in Fig. 7 by means of the manual control lever the liquid under pressure from the pump and pipes 87 and 86 can enter one end of cylinders 71 and 73 through pipes 83 and 84. The opposite ends of the cylinders 71 and 73 not under pressure are open to the sump 96 through pipes 78 and 79. Any desired pressure can be applied to shaft 60 and roller 12 by varying the liquid pressure from the pump and by adjusting valve 88. By shifting piston valve 95 in the opposite direction, to the right as viewed in Fig. 7, the opposite ends of cylinders 71 and 73 are opened to the sump 96 through pipes 83 and 84 and the pressure on roller 12 is reduced. The valve 95 may be adjusted further to pass high pressure liquid from the pump through pipes 86, 79 and 78 to the cylinders 71 and 73 to move the roller 12 out of pressure contact with the band 15.

The opposite ends of each of the cylinders 72 and 74 are cross-connected with a pipe 100 which is connected through pipe 101 to the central portion of the band operated control valve 103. This valve is also a well known type of four-way plug valve comprising a cylinder 104, spaced apart pistons 105 and 106 on the rod 107 which carries a roller 108 which is pressed against the band 15 by the spring 109. The other opposite ends of each of the cylinders 72 and 74 are cross-connected by pipe 112 which is connected by pipe 113 to the valve 103. The pipes 100 and 112 may be made partly or entirely of pressure hose to provide flexibility because of the movement of the cylinders 72 and 74. Pipes 100 and 112 have pressure gages 110 and 111 respectively. The pipe 114 connects through valve 115 and spring loaded valve 116 to pipe 87 for the supply of liquid under high pressure from the pump.

Pipe 117 connects opposite ends of the cylinder 104 with the sump 118. With reference to Fig. 7, should the band move downward, the follower roller 108 will set the pistons 105 and 106 off center and send the liquid, usually oil, from pipe 114 through valve 103 and pipe 113 into pipe 112 resulting in oil entering the training cylinder 72 on one end and training cylinder 74 on the opposite end. Simultaneously, piston 105 of the plug valve permits oil to be drained off through pipes 100 and 101 to the sump 118. By this means, a certain pressure (depending on crawl of the band) is added to that applied by rod 70 to the tension roller 12 and subtracted from that applied by the rod 68 to the tension roller. The net effect on the overall pressure applied to the band is nil, the sole effect being to cant the axis 60 of the tension roller 12 slightly and thereby train the band upward. This process occurs in reverse, of course, if the band starts to creep in the opposite direction. The pressure gages 89, 90, 110 and 111 are merely used to indicate the working pressure and may be omitted as they do not affect the operation of the apparatus.

Figure 4:
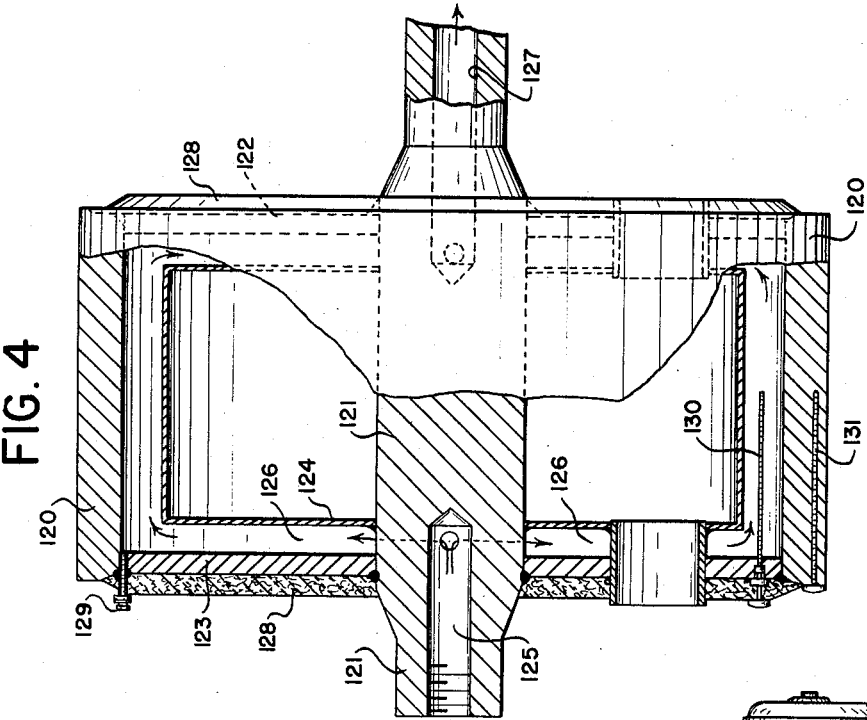
Fig. 4 is a view, partly in section, of one of the rollers used in the apparatus of Fig. 1.

Fig. 4 illustrates one of the rollers in cross-section showing one suitable means of heating the rollers. The hollow cylinder 120 is mounted on the shaft 121 by the circular plates 122 and 123. Inside the cylinder is a baffle 124 attached to the axle for directing the flow of heating fluid. The fluid, steam or hot water, enters the axle at 125 and flows in the space 126 between the cylinder plates and baffle in the direction of the arrows and is discharged through the opening 127 in the shaft. To prevent an undue loss of heat the plates are covered with thermal insulation 128 held on by bolts 129. Temperature measuring devices 130 and 131 are installed to record the space and cylinder temperatures respectively.

Figure 3:
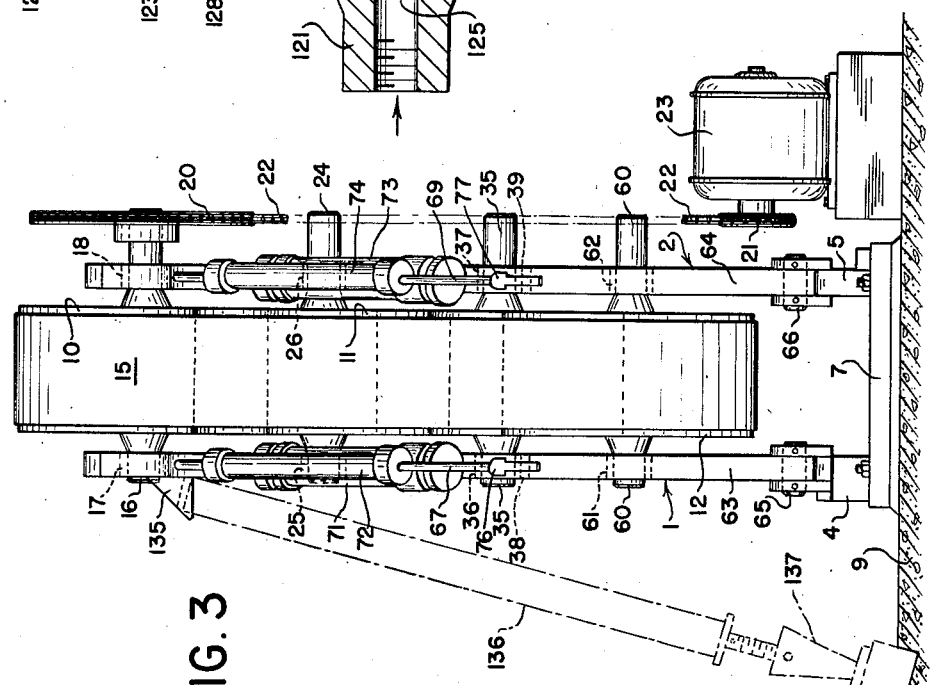
Fig. 3 is an end view of the apparatus of Fig. 1.

In order to remove or replace the endless band, the apparatus is mounted on the removable blocks 3, 4, 5 and 6. The side frame 1 has a projecting bracket 135 for receiving a heavy beam 136 as shown in broken lines in Fig. 3. It is the usual practice to slacken the band and remove the curing roller 11 before lifting one side of the apparatus. After removing bolts 27 and bracket bearings 25 and 26 the roller 11 can be removed with a traveling hoist while supported on a rod inserted in hole 28. By means of a screw jack 137 the machine may be lifted on one side and the blocks 3 and 4 removed. The band can then be removed, and a replacement can be made by reversing the operation.

The operation of the machine will be described with reference to an operation for compressing loose wood fibers containing some moisture, a wax lubricant and a phenol-formaldehyde thermosetting resin binder. The fibers are formed into a compacted web of indefinite length which is fed continuously in between the band 15 and the curing roller 11. The band 15 is driven by roller 10 as previously described. By means of screws 40 a supplemental pressure is applied by roller 13 against the band and web M. The web is compressed and heated by the hot rollers 11 and 13 and band. The shoe 45 holds the band in pressed contact with roller 11 to aid in preventing the web from expanding. As the web travels under the heaters 30 it is further heated for the final setting of the resin. The hard, smooth but flexible web M leaves the apparatus where it is led away from the band at any desired place. The apparatus of the invention can apply pressures of from 150 to 200 p.s.i. while the band is traveling at from 25 to 100 feet per minute.

I claim:

In apparatus for compressing and heating materials in the form of sheets including an endless metal band, a plurality of rollers over which the band travels including a drive roller, a curing roller, and a tension roller, means for adjusting the tension roller to vary the tension on the band, the rollers being arranged so that the band passes over an arcuate segment of the curing roller, means for passing the material between the curing roller and the band and means for heating the curing roller and the band passing over the curing roller segment, the improvement which comprises means for heating each of the other rollers which contact the band to the approximate temperature of the curing roller to thereby maintain uniform tension in the entire band.

References Cited in the file of this patent
UNITED STATES PATENTS

| 2,082,895 | Knowland | June 8, 1937 |
| 2,591,995 | Apel et al. | Apr. 8, 1952 |